(12) United States Patent
Armer et al.

(10) Patent No.: US 9,746,170 B1
(45) Date of Patent: *Aug. 29, 2017

(54) ADJUSTABLE LIGHT FOR UNDERWATER PHOTOGRAPHY

(71) Applicant: Light & Motion Industries, Marina, CA (US)

(72) Inventors: Jarod Armer, Aromas, CA (US); Mark Olsson, La Jolla, CA (US); Christopher McCaslin, Alameda, CA (US); Theodore Masek, Monterey, CA (US); Brooks Lame, Seaside, CA (US)

(73) Assignee: Light & Motion Industries, Marina, CA (US)

( * ) Notice: Subject to any disclaimer, the term of this patent is extended or adjusted under 35 U.S.C. 154(b) by 339 days.

This patent is subject to a terminal disclaimer.

(21) Appl. No.: 14/520,283

(22) Filed: Oct. 21, 2014

Related U.S. Application Data

(63) Continuation-in-part of application No. 13/373,477, filed on Nov. 14, 2011, now Pat. No. 8,864,326.
(Continued)

(51) Int. Cl.
| | |
|---|---|
| *G03B 15/02* | (2006.01) |
| *F21V 29/58* | (2015.01) |
| *F21V 29/503* | (2015.01) |
| *F21V 31/00* | (2006.01) |
| *F21L 4/00* | (2006.01) |
| *F21V 9/08* | (2006.01) |
| *F21V 29/508* | (2015.01) |
| *F21V 23/04* | (2006.01) |

(Continued)

(52) U.S. Cl.
CPC ............... *F21V 29/58* (2015.01); *F21K 9/58* (2013.01); *F21L 4/00* (2013.01); *F21V 9/083* (2013.01); *F21V 23/005* (2013.01); *F21V 23/0414* (2013.01); *F21V 29/503* (2015.01); *F21V 29/508* (2015.01); *F21V 31/005* (2013.01); *G03B 11/00* (2013.01); *G03B 15/02* (2013.01)

(58) Field of Classification Search
CPC ...... F21V 29/58; F21V 29/503; F21V 29/508; F21V 31/005; G03B 17/08
USPC .................................................. 362/6, 158
See application file for complete search history.

(56) References Cited

U.S. PATENT DOCUMENTS

| | | | |
|---|---|---|---|
| 6,547,414 B2 * | 4/2003 | Steger | F21L 4/00 362/158 |
| 7,125,146 B2 | 10/2006 | Willis et al. | |

(Continued)

FOREIGN PATENT DOCUMENTS

| | | |
|---|---|---|
| WO | WO2007096814 | 8/2007 |
| WO | WO2007141688 | 12/2007 |

*Primary Examiner* — Peggy Neils
*Assistant Examiner* — William N Harris
(74) *Attorney, Agent, or Firm* — Thomas M. Freiburger

(57) ABSTRACT

An underwater diving light includes efficient cooling of LEDs and other internal electronics by heat transfer to ambient water. The water is in contact with a metallic face plate or puck that conducts heat via contiguous metal from an LED circuit board or LED face plate. Ambient water can enter the assembly to spaces between the face plate and an intermediary plate at the front of a housing to efficiently cool the LEDs and associated electronics. In a high-output form the light can emit 8000 lumens, and in this embodiment the battery is cooled by ambient water. The face plate or puck is interchangeable, for different lighting characteristics.

19 Claims, 17 Drawing Sheets

Related U.S. Application Data

(60) Provisional application No. 61/414,873, filed on Nov. 17, 2010.

(51) Int. Cl.
  *F21V 23/00* (2015.01)
  *G03B 11/00* (2006.01)
  *F21K 99/00* (2016.01)

(56) References Cited

U.S. PATENT DOCUMENTS

| | | |
|---|---|---|
| 7,303,301 B2 | 12/2007 | Koren et al. |
| 7,311,417 B1 | 12/2007 | Lemke |
| 7,520,629 B2 | 4/2009 | Johnson et al. |
| 2001/0007414 A1 | 7/2001 | Inoue et al. |
| 2002/0125804 A1* | 9/2002 | McGuire ............. F21L 4/00 313/112 |
| 2003/0169591 A1* | 9/2003 | Cochran ............. F21V 21/406 362/158 |
| 2005/0047122 A1* | 3/2005 | Kuo ............. B63C 11/205 362/158 |
| 2006/0018113 A1 | 1/2006 | Upmeyer |
| 2006/0039150 A1 | 2/2006 | Mayer et al. |
| 2006/0067077 A1 | 3/2006 | Kumthampinij et al. |
| 2006/0221605 A1* | 10/2006 | Theriault ............. F21V 33/0076 362/205 |
| 2007/0145915 A1 | 6/2007 | Roberge et al. |
| 2007/0279900 A1* | 12/2007 | Bauer ............. F21S 8/00 362/158 |
| 2008/0130268 A1* | 6/2008 | Johnson ............. F21L 4/00 362/103 |
| 2009/0014624 A1 | 1/2009 | Blees et al. |
| 2009/0154164 A1* | 6/2009 | Hsu ............. F21S 8/00 362/267 |
| 2010/0033948 A1 | 2/2010 | Harbers et al. |

* cited by examiner

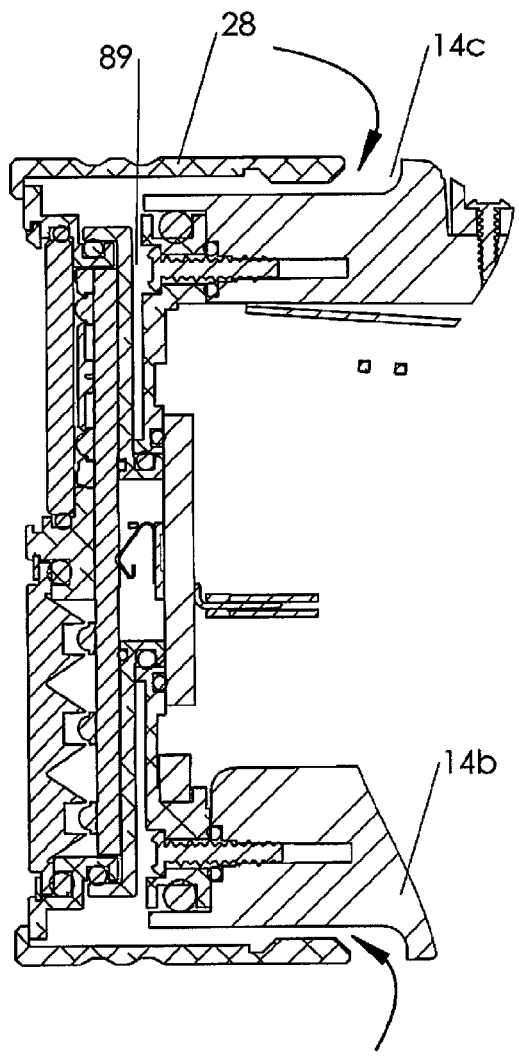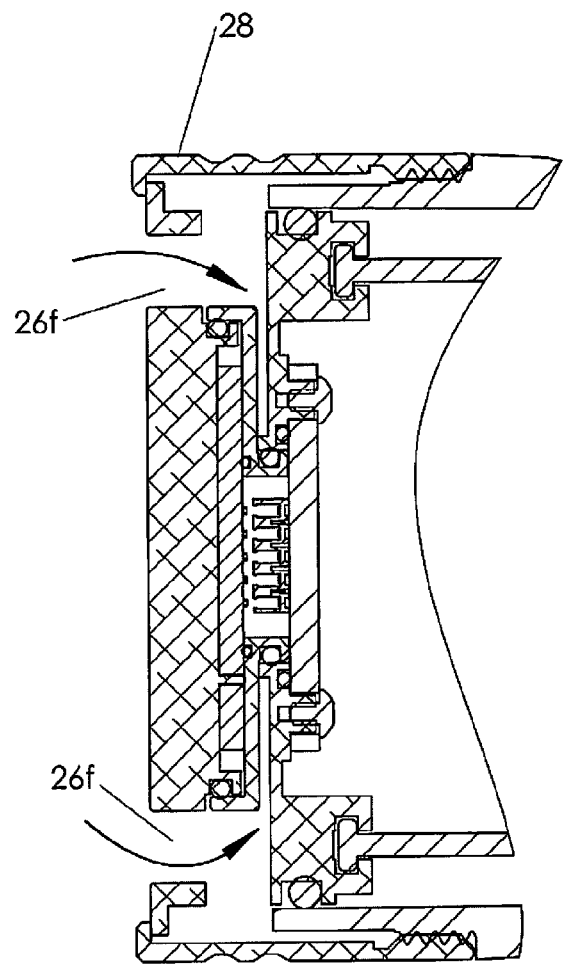
FIG 14
FIG 15

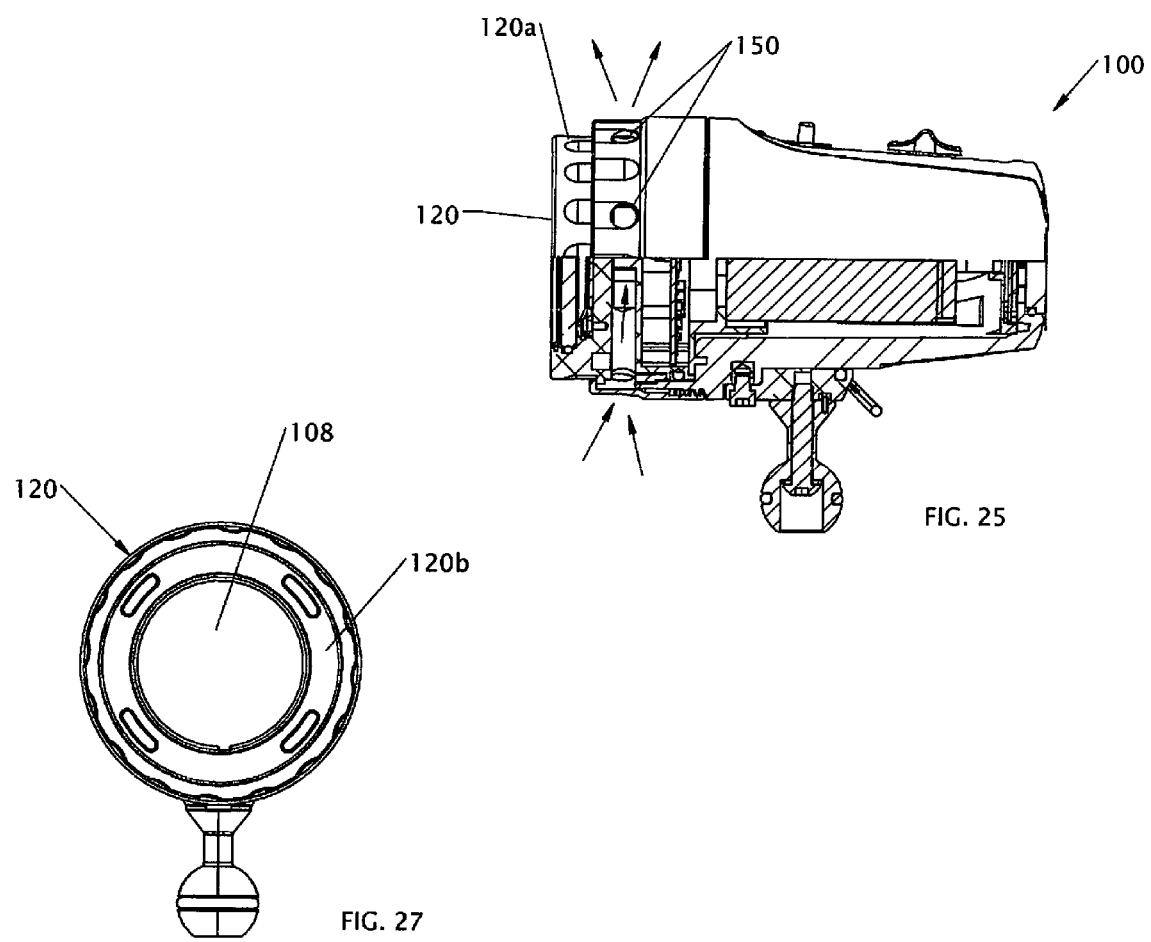

ADJUSTABLE LIGHT FOR UNDERWATER PHOTOGRAPHY

This application is a continuation-in-part of application Ser. No. 13/373,477, filed Nov. 14, 2011, to be issued Oct. 21, 2014 as U.S. Pat. No. 8,864,326, which claimed benefit of provisional application Ser. No. 61/414,873, filed Nov. 17, 2010.

BACKGROUND AND SUMMARY OF THE INVENTION

The invention concerns underwater video lighting, and particularly a unit producing a powerful beam from LED sources, with the ability to adjust light filtration by rotation of a front filter ring. The underwater light may produce flood light at about 4000 lumens and weighs less than two pounds.

A number of underwater lighting devices are available for divers, some with rechargeable batteries and some also including flip-down color filters, such as red filters.

When an underwater photographer, including a video photographer, dives below about thirty feet during daylight, virtually all red has been filtered out of the ambient light. Because of the color adjustment (white balance) that is usually made by the diver's video camera, the colors in the video images will be adjusted to replace the red, but light projected from a diving light will compete with ambient light and areas of the video image that include the artificial light will appear overly red when color-balanced by the camera. The situation is different in night diving, in which the only light available is that from the diving light, and unbalance of color in different areas of the image is not a problem.

Most diving lights previous to this invention have been little more than waterproof flashlights. None has included any filter to address the color balance problem noted above, nor has any included a convenient multi-filter manual selection on a powerful video diving light as in the current invention described below.

The diving light of the invention, particularly for video support, is a relatively large underwater device, yet light in weight, with a beam which can be about 4000 lumens of flood light. Within the light's casing is a battery providing for about one hour of light at 4000 lumens (or about two hours of light at 2000 lumens, or about four hours of light at 1000 lumens).

The dive light of the invention has a snap-on front filter ring, interchangeable with other filter rings as selected, the filter ring being rotatable about the face of the light casing and having several selectable filters. Light projection is from an off-center position on the face of the housing, enabling different filters to be placed in front of the light beam by rotation of the bezel. One important filter preferably included on the dive light is a blue/green filter, which can be used to approximately match the projected light beam to the ambient lighting when diving in conditions of near-total red depletion from the natural light.

The light source of the device is a very tight cluster of LEDs, which may be sixteen in number. The tight cluster enables the off-center positioning of the light source as noted above. The tight LED array generates considerable heat, making the LED mounting board and surrounding areas hotter than would be the case if the LEDs were spread around the entire face of the housing. To dissipate the heat the LEDs are mounted onto a metal core board, and the face of the unit preferably is mostly metal and contacts the LED board. This provides an efficient heat sink for the LED array. Only a small sealed window is provided, directly in front of the LED cluster.

Federal Aviation Administration (FAA) regulations require that devices generating significant amounts of heat must have the power source and heat generating element physically disconnected for air travel. So the device must allow a user easily to physically disconnect the LED cluster from the battery at some point in the circuit. Most dive lights do this by either (a) allowing the user to disconnect and/or remove an internal battery, or (b) using a separate battery housing with a cable and connector leading to the light head. The former requires opening a part of the device that is typically sensitive to water intrusion. Opening and closing a pressure seal repeatedly can and does introduce physical damage or dirt and grime to the seal, providing a path to potential flooding and corrosion. The latter adds a second pressure hull and a flexible cable, both of which are additional potential failure points.

An important second aspect and form of the invention therefore encompasses an advanced sealing setup. In use it is an entirely self-contained assembly, but it allows disconnection for FAA compliance, and when disconnected the separate assemblies are themselves completely sealed. Specifically, in this form the face plate assembly containing the LEDs is an individual pressure hull, but it can be easily removed by unthreading the bezel ring and pulling the face plate assembly off of the body unit. The body unit is itself an individual pressure hull. As an added benefit for easy storage and to prevent possible damage, the bezel ring allows the face plate assembly to be flipped over and stored backward, so that the device is electrically disconnected but physically in one piece.

In order to allow this easy disconnect, the back of the metal core circuit board is equipped with a series of exposed contact pads on the rear face. These pads are plated with a corrosion-resistant material, typically gold, and they are contacted by a series of spring-loaded knee-type contacts attached to an intermediary plate on the front of the body unit. The knee-type contacts are also plated with corrosion-resistant material. A heavy-gauge nonconductive alignment pin is used to help the user align the face plate assembly to the body unit so the connections are made reliably. The face plate assembly is sealed to the body unit by a large bore o-ring so that the entire area between the face plate assembly and the body unit is dry.

Another important part of the face plate assembly and body unit structure is cooling of electronics contained in the body unit. While the LEDs produce most of the heat in the system, the drive electronics can produce upwards of 10%, or about 6 watts when running at 4000 lumens. Without proper heat dissipation the drive electronics can overheat and fail. For this reason, in this second form of the invention, the intermediary plate is equipped with thermal transfer pads that interface to wide areas on the rear of the face plate assembly, providing a relatively short thermal path from hot components to intermediary plate to face plate to water. In this form, both the metal core circuit board and the intermediary plate are passing heat through the face plate to the water, which is fairly efficient.

In order to output the maximum amount of light possible, LEDs must be cooled as much as possible. In a typical case, cooling the LEDs from 55 down to 45 degrees Celsius will increase output approximately 100 lumens when running at 4000 lumens, with no other changes, so the shortest heat path from LED to water is desirable.

In the first and second forms of the invention, the metal core circuit board is connected around its edges to the face plate. Thus all the heat must travel laterally across the metal core circuit board to be conducted away. In a third form of the invention, the face plate assembly is not sealed to the body unit, but instead it has large holes to allow water flow into the cavity between body unit and face plate assembly. The face plate assembly has a large rear cap that encloses the metal core circuit board to protect it from corrosion. This rear cap also has a collared area that extends toward the intermediary plate and creates a sealed volume around the connector pads and connector. Thus the heat path is through the thickness of the metal core circuit board and the thickness of the rear cap, rather than along a greater lateral distance.

In a fourth form of the invention, the metal core circuit board is allowed to directly contact the water, for even better cooling. This can introduce corrosion on the metal core circuit board, but if the device is properly rinsed in fresh water and dried between uses (typical and customary for this type of equipment) the corrosion is minimal and the heat path is reduced further to just metal core circuit board to water. In this form, the rear cap takes a different form and is just the collar bolted to the central area of the metal core circuit board, to form the sealed volume around the connector. Additional benefits of this form are reduction in overall weight, and increased volume of cooling water inside the head, due to the smaller sealing collar instead of the fully enclosing cap of the third form.

Another form of the invention that is compatible with any of the four sealing and thermal solutions discussed above, employs a second array of LEDs added to a larger metal core circuit board. The multi-function switch on the body unit provides the user the ability to easily turn on one or the other array of LEDs. The second array can be a different color such as red, can be electromagnetic energy outside the visible spectrum such as infrared or UV light, or can be any wavelengths of light focused by dedicated optics, such that the upper array can provide a wide flood light and the lower array a focused spot beam. The advantage of the clustered arrays is that the blue or red filters held by the rotating filter ring enable use of light either filtered or unfiltered, by rotating the filter ring into various positions.

Another benefit of the removable front plate is the ability to provide interchangeable face plate assemblies to a user. A user might choose to switch face plates (a) to upgrade to a new brighter set of LEDs, (b) to replace a failed face plate or body unit, (c) to switch between colors or types of single-mode face plate units, for instance spot-only for flood-only, (d) to switch from a single-mode face plate unit to a multi-mode face plate unit such as spot plus flood. The body unit electronics can be designed to recognize the available use modes of the attached face plate unit by a detector circuit, and adjust the type of switching available to increase ease of use.

A typical equipment setup for underwater still photography includes a sealed camera housing and one or more underwater strobe units. In the past, film photography required the intense output of powerful flashbulbs; these flashbulbs produced very short bursts of light typically 8-10 times as bright as video lights. Digital photography increasingly allows use of much less powerful lighting to achieve the same results. As self-contained underwater lights increase in power, it is possible to completely replace dedicated flash units with video lights in some situations. Replacing strobes is even more practical if the video lights are capable of producing short bursts at increased power levels, for instance two times the maximum constant output of the light for video use. The final form of the invention, which is compatible with all other forms previously discussed, addresses this need. In this form, one or more large capacitors are added to the electronic circuit to provide a short, powerful burst of energy, which along with the power available directly from the battery, is capable of generating the flash output. The battery charges the capacitor(s) in between flashes. The flash is timed to the shutter of the camera by a synch cable. The synch cable can be a fiber optic cable carrying light from the camera's flash unit, or an electronic cable carrying an industry-standard synch signal.

The light unit of the invention is charged using external wet style connectors, allowing the unit to be sealed at the factory and never opened in the field, improving reliability for the diver.

It is an object of the invention to improve over previous dive lights available for video support, including in brightness, duration, cooling efficiency, and convenient filtering of the light beam as needed. These and other objects, advantages and features of the invention will be apparent from the following description of a preferred embodiment, considered along with the accompanying drawings.

DESCRIPTION OF THE DRAWINGS

FIG. 14 is a partial side elevation section view of the front of the third form of the invention, showing flow of water into the assembly.

FIG. 15 is a partial top plan section view of the front of the third form of the invention, showing flow of water into the assembly.

FIGS. 25 and 26 are side elevation views of the light assembly, in partial and full section, respectively.

FIG. 27 is a front elevation view of the assembly.

DESCRIPTION OF PREFERRED EMBODIMENTS

Figure 1:
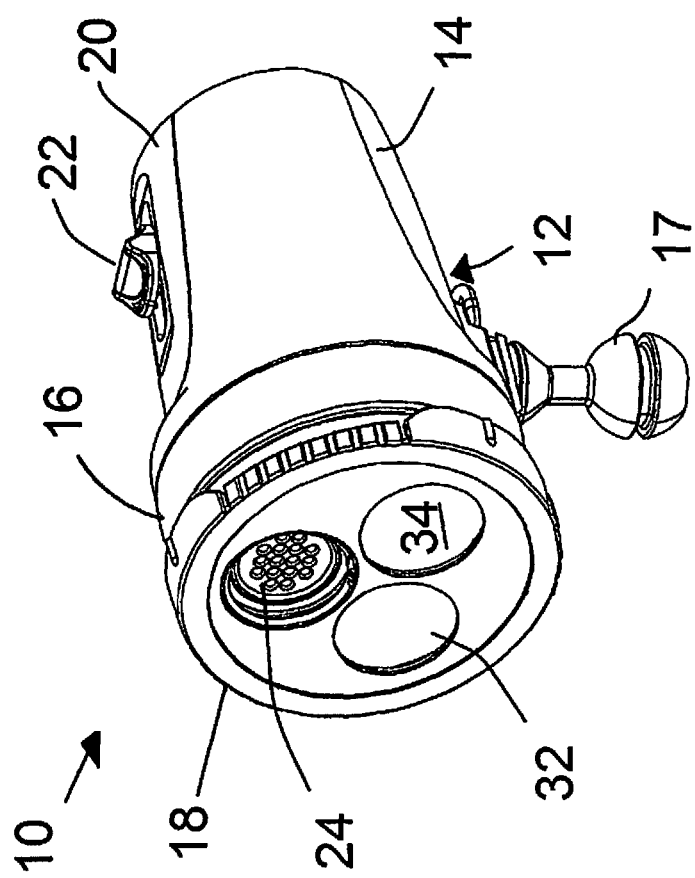
FIG. 1 is a perspective view showing a diving light of the invention.

In the drawings, FIG. 1 shows a dive light 10 having a housing 12 formed of a casing 14, a front section or face assembly 16 attached to the casing, which can be by sealed threaded connection, a mounting interface device 17 and a rotatable filter ring 18. The device 17 is shown as a standard interface, to be received in a socket on a camera light arm accessory. On the casing is a switch assembly 20 with slide switch 22, for switching the dive light on and off and selecting a desired power level. At the front of the dive light device a beam is projected by an array 24 of LEDs in a tight cluster as shown. These may be sixteen in number.

Figure 2:
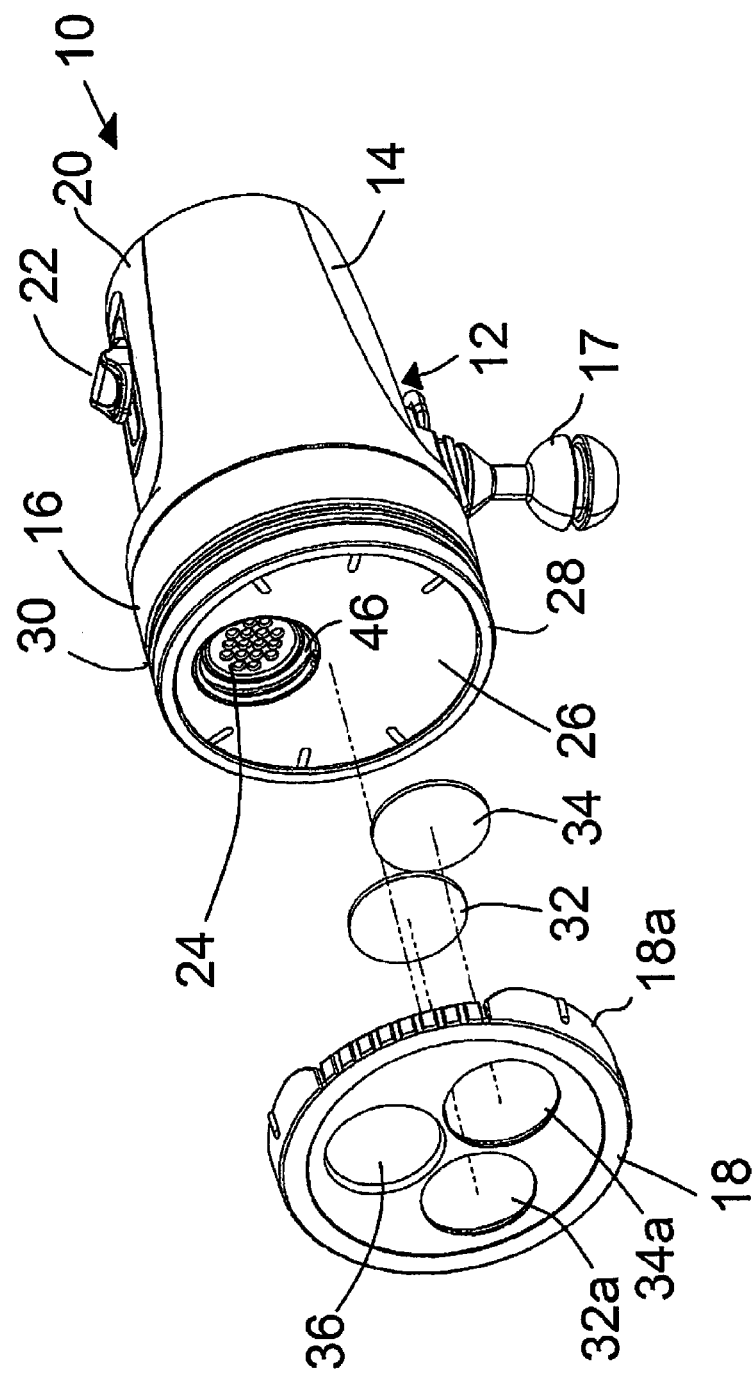
FIG. 2 is a partially exploded view of the first form of the diving light, showing a front filter ring removed.

With reference to both FIGS. 1 and 2, the filter ring 18 snaps onto and off a position of covering the front face 26 of the unit. The front of the unit has a bezel ring 28, forming an annular recess 30, which is gripped by overhanging structure (not shown in FIGS. 1 and 2) on the rim 18a of the filter ring to hold the filter ring in place on the housing, and to allow its snap-off removal and interchanging with another filter ring when desired. The purpose of the rotatable filter ring 18 is to provide different filtration for light emitted from the LED array 24. Light filters 32 and 34 are shown, secured in filter ring openings 32a and 34a. A third filter ring opening 36 can be fitted with another filter or can be left open, as shown, for a selection of no filtration.

As noted above, one of the filters 32 preferably is a blue/green (cyan) filter, for filtering out most of the red component of the light beam to match the artificial light closely with ambient light filtering through relatively deep water. The blue/green or cyan filter, used at depth, makes the LED light beam close to the color of natural light at depth, and the user's video (or still) camera will light balance the image correctly so that objects illuminated from the dive light will look normal in the video or photograph. This is a great advantage in daytime wide angle photography and video where ambient light is the dominant light; without the cyan filtration the dive light will produce different color lighting from the ambient light, creating an unbalanced and undesired appearance in the picture or video.

The other filter 34 can be a diffuser, which will spread and disperse the flood light more widely. Preferably, any of the optical filters are mounted in industry-standard threaded rings that can be assembled or disassembled from the filter ring simply by threading in or out.

The slide switch 22 is a toggle switch. It operates within the non-waterproofed switch assembly or sub-housing 20, by magnetic interface with magnetic pickups inside a sealed casing 14. In a preferred embodiment of a single-mode LED face plate, the switch is effective as follows: a momentary push forward will turn the light on, preferably at a medium power level, or power level 4; a series of further momentary pushes forward will change the beam to levels 5, then 6, then 7 or high power; a momentary push back will lower the light level among the seven different settings successively; and a forward or back push with a hold (e.g. two seconds) will turn the power off. When using multi-mode LED face plates, such as spot-flood, a momentary push forward or backward will change the power level upward or downward among the available number of power settings in the current array, a push and hold forward will switch between LED arrays (e.g. from spot to flood), and a push backward with a hold, will turn the light off.

Figure 3:
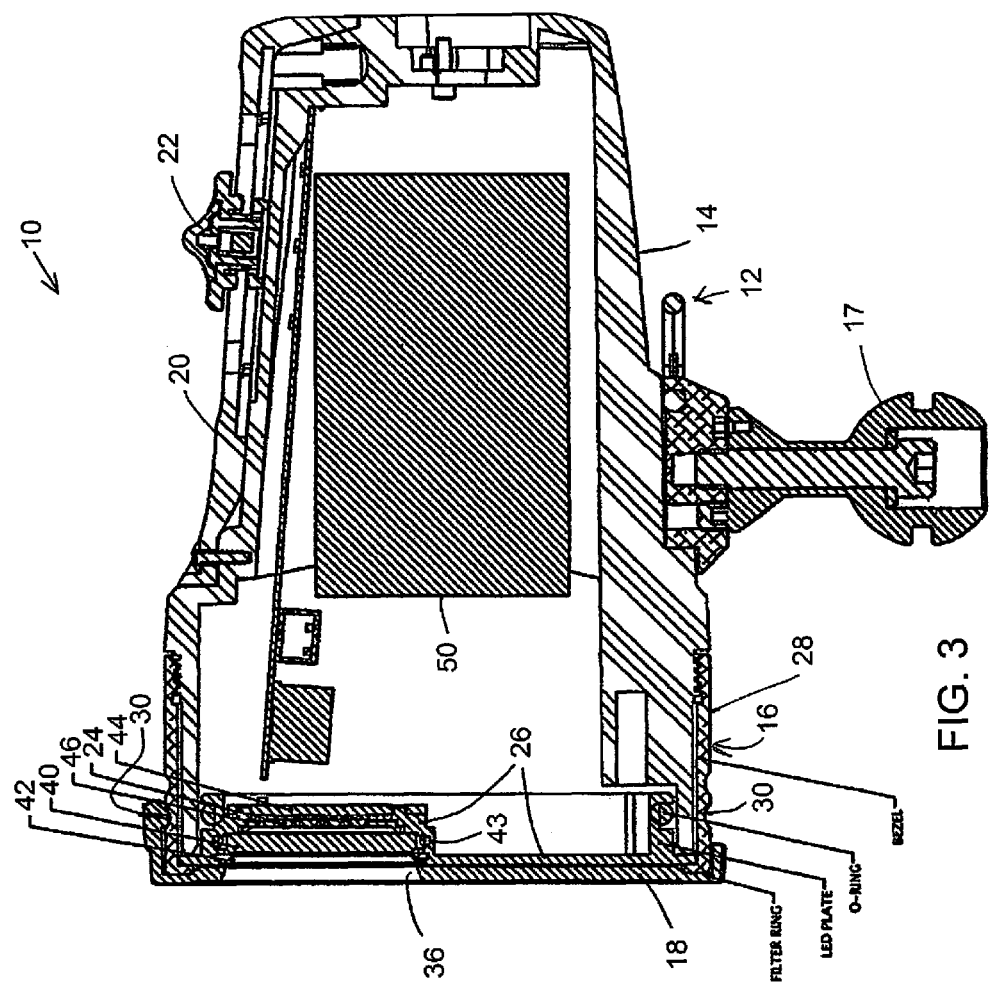
FIG. 3 is a side elevation view in section showing the assembly of the first form of the diving light, particularly the front.

FIG. 3 is a side elevation view of the first heat path option in section illustrating the dive light 10 and particularly positioning and connection of components at the front of the unit. The face plate is seen at 26. Within the upper opening of the face plate is a circular glass window 40 retained within a recess of the face plate using a retaining ring indicated at 42. A water tight seal is made with a seal ring or O-ring 43. In one embodiment a metal core circuit board 44 or LED mounting plate has soldered to it all of the LEDs (preferably sixteen) of the LED array 24, as shown. Other forms of LEDs can be used, as explained below. The LED array produces a flood beam, approximately 80° spread in water, approximately 110° spread in air (although the spread could be different). Thus, the optics are simple. A reflector 46, best seen in FIG. 2, is incorporated within the recess having the glass window 40 at front. The reflector, preferably conical, may be formed as a surface on the face plate 26, which preferably extends inward as shown. The glass window 40 is indicated as "port" in FIG. 3.

As mentioned above, the LED array 24 is a very tight cluster and generates considerable heat, particularly at high power setting. This is dissipated using a heat sink which comprises the metal core circuit board 44 or LED plate and metal face plate 26, including the portion extending rearwardly to contact the circuit board or LED face plate 44 as shown. The metal core circuit board 44 is screwed onto the face plate 26, both of which can be aluminum. The large aluminum plate 26 at the face of the unit contacts water on the outside surface, which immediately cools the attached metal core LED board and prevents overheating.

The filter ring 18 is also shown in FIG. 3, rotatable on the housing and retained thereon via the annular groove 30 in the bezel ring 28.

The dive light unit 10 is self-contained, including a rechargeable battery indicated at 50. A wet style recharging terminal (not shown) enables sealing of the unit without need to open it after manufacture.

Figure 4:
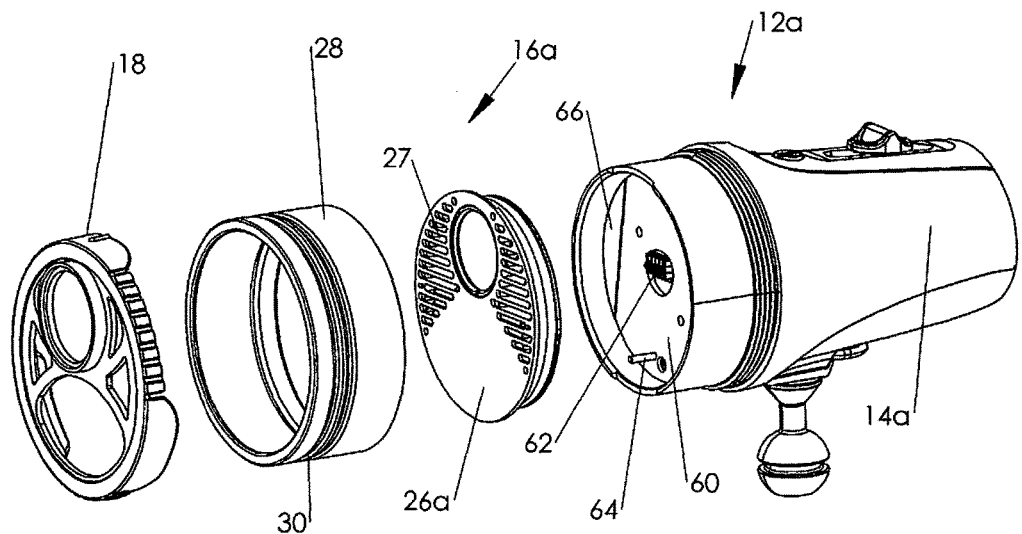
FIG. 4 is an exploded view of the separate assemblies in the second form of the invention.

FIG. 4 shows the assemblies a user will encounter when operating a second form of the invention. The filter ring 18 comes off as previously described. The user then unthreads the bezel ring 28, exposing the edge of a face plate 26a of the face assembly 16a. Pulling on the face plate 26a removes it from the body unit 12a. An intermediary plate 60 encloses the housing or body unit 12a together, being secured to the body 14a, and provides a mounting location for a multi-contact electrical connector 62. The intermediary plate 60 also has two symmetrical thermal transfer pads 66 that contact the back of the face plate 26a to provide an escape path for heat from the electronics inside the body unit.

Finally, it has a steel alignment pin 64 so that the user can easily orient the face plate 26a so that the connectors are properly aligned.

Figure 6:
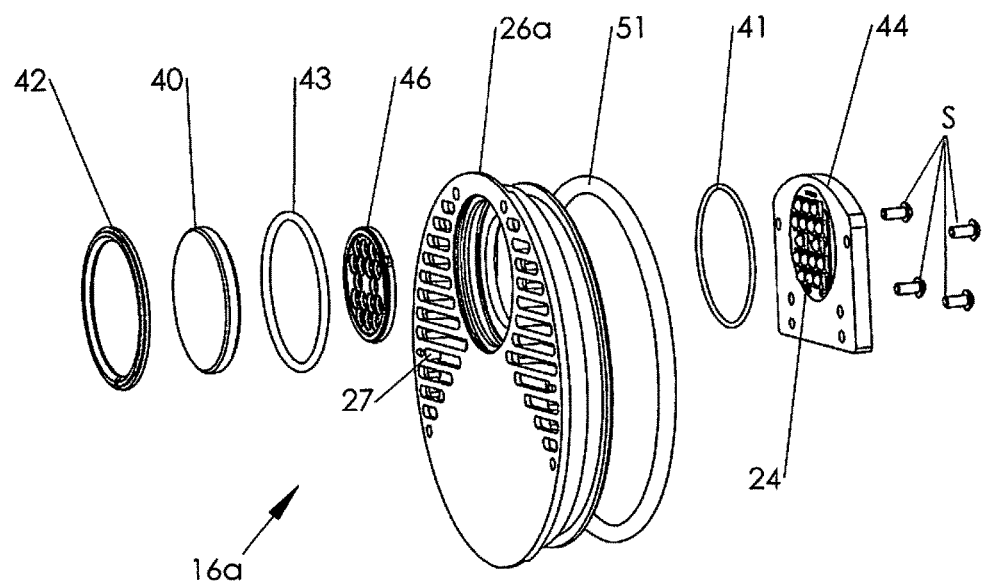
FIG. 6 is an exploded view of the face plate assembly in the second form of the invention.

FIGS. 4 and 6 shows grooves 27 formed in the front of the face plate. These grooves or recesses expand the surface area available for cooling by water contact; they do not extend through the face plate.

Figure 5:
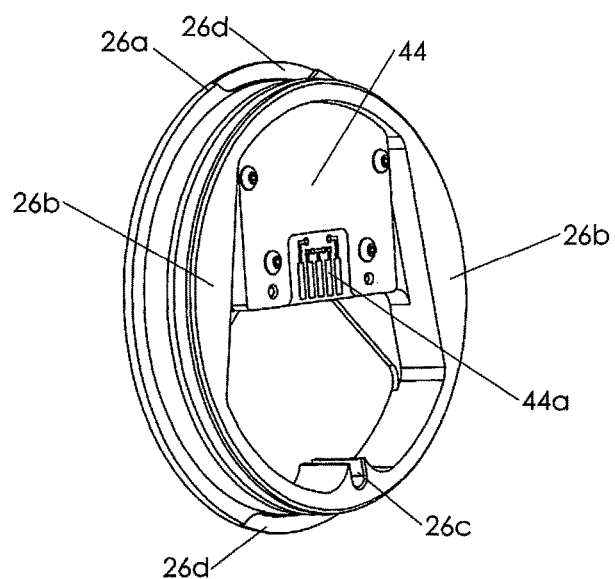
FIG. 5 is a view of the back side of the face plate assembly in the second form of the invention.

FIG. 5 shows the reverse side of the face plate assembly. The previously described LED array is mounted to a metal core circuit board 44, similar to the metal core circuit board described previously. On the back side of that board are gold plated contact pads 44a, which interface with the connector 62 from FIG. 4. Two wide areas 26b provide broad contact for thermal transfer from the thermal pads 66 shown in FIG. 4. An alignment feature 26c accepts the alignment pin 64 shown in FIG. 4 to ensure connector alignment. To help the user remove the front plate assembly from the body unit, there are two stepped areas 26d in face plate 26a that are sized to accept common coins such as a U.S. quarter dollar. Inserting and twisting the coin allows the user to overcome the significant friction of the main bore seal o-ring (part 51 in FIG. 6).

FIG. 6 shows the face plate assembly 16a for this second form of the invention. The face plate 26a holds the reflector 46 and glass port or window 40, sealed by an o-ring 43 and retained by a retaining ring 42, as previously described. The main seal o-ring 51 is installed on the plate 26a to seal against the inner bore of the body unit. The metal core circuit board 44 is sealed to the face plate by an o-ring 41, and held on by four screws S that lie outside the seal groove. This keeps the LED components on the circuit board from any contact with water, even if the main seal o-ring 51 fails at some point.

Figure 7:
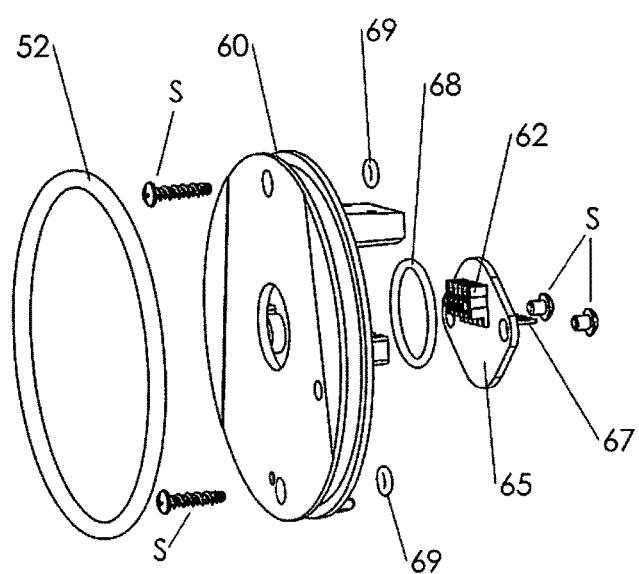
FIG. 7 is an exploded view of the intermediary plate in the second, third, and fourth form of the invention.

FIG. 7 shows the intermediary plate 60 that is installed in the front of the casing or body 14a. It is permanently sealed into the body by a main bore o-ring 52, and held in with two screws S, which are sealed by two small o-rings 69. At the center of the intermediary plate 60 is an opening for mounting a connector circuit board 65, which is sealed to the intermediary plate by an o-ring 68 and held in place with two screws S. Thus the connector board 65 is exposed at the front of the housing or body unit 12a so it can contact the connector pads 44a on the metal core circuit board 44, but otherwise the body unit 12a is completely sealed.

Figure 8:
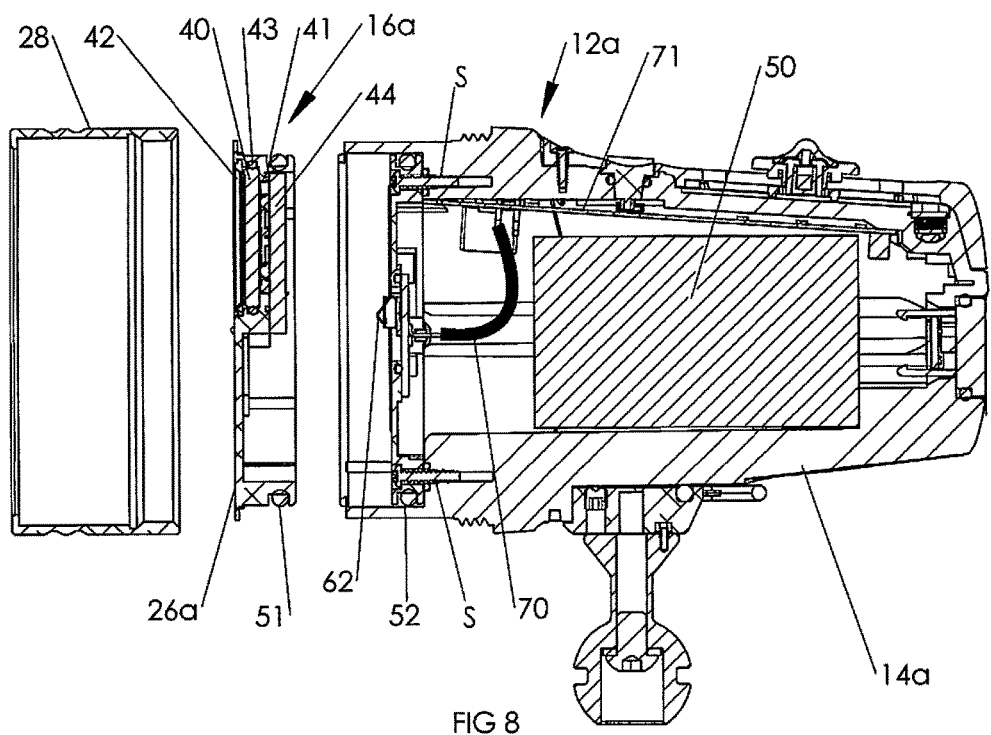
FIG. 8 is a partially exploded side elevation view, in section, of the second form of the invention.
Figure 9:
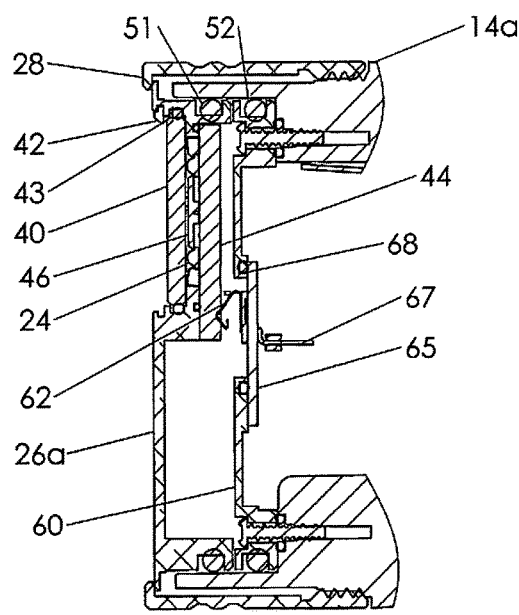
FIG. 9 is a side elevation view, in section, of the second form of the invention, at the front.

FIGS. 8 and 9 show the bezel ring 28, face plate assembly 16a, and casing or body 14a exploded and then assembled in cross section to illustrate the electrical path and assembly method. The battery 50 is connected to a main driver electronics circuit board 71 by a cable (not shown). The driver 71 controls the amount of power routed to the LED cluster, and outputs current through a cable 70, through a header 67 on the back of the connector circuit board 65, through the board, to spring loaded contacts of the connector 62 exposed at the front of the unit 12a. See also FIG. 4. The intermediary plate 60 is sealed into the body 14a by the o-ring 52. The face plate assembly is sealed into the body by the o-ring 51.

The form of diving light shown in FIGS. 4-9 efficiently carries away heat, both from the LED array and from electronics inside the body unit 14a. Heat from electronics inside the body unit is conducted through the contact pads 66 on the intermediate plate 60 to the wide areas 26b on the back of the face plate, via pressed and wide-area contact when the bezel 28 is tightened onto the body. Also, heat from the LED array on the front of the metal core circuit board 44 travels outwardly through the metal board to the tight connection between the metal board 44 and the back side of the face plate 26a. The front of the face plate 26a, cooled by direct contact with water and with enhanced surface area provided by the grooves 27, dissipates the heat from the body 14a and from the LED array to the water.

Note that the metal core circuit board in the embodiments of FIGS. 1-9, in thermal conductive contact with the face plate in both cases, is preferably in direct contact with the face plate, but the contact could be indirect, via intermediary conductive metal.

As noted above, the face plate 26a, for purposes of air travel, can be pulled out from the casing or body 14a after removal of the threaded bezel ring 28. This can also be done for the purpose of interchanging a different face plate on the body, such as for different spot/flood characteristics or different light colors or an upgraded face plate. For air travel, where the LED array may have to be completely disconnected from electronics connected to the battery, the face plate 26a can be flipped around, placed against the front of the body and secured thereon using the bezel ring 28. The exposed rear contacts 44a (FIG. 5) of the face plate, now oriented forwardly, can be covered with a plastic cover or cap (not shown).

Figure 10:
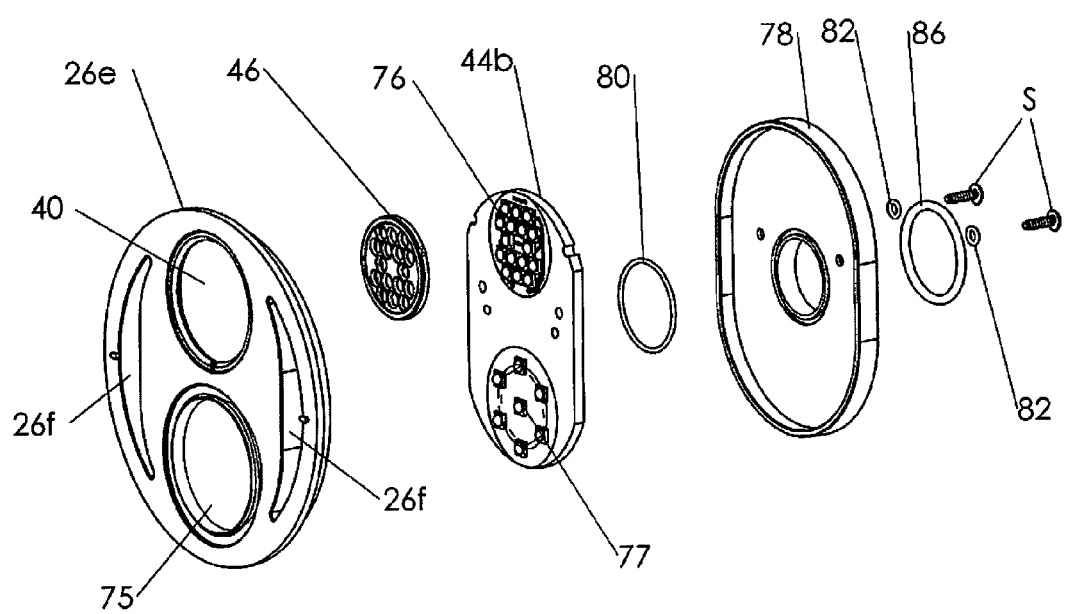
FIG. 10 is an exploded view of the face plate assembly showing the third form of the invention. This figure also shows a face plate with two LED arrays.
Figure 11:
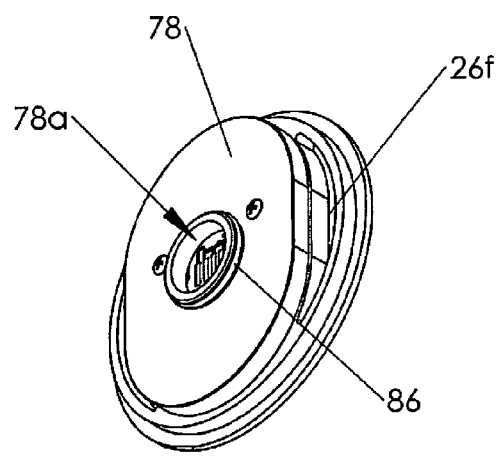
FIG. 11 is a rear view of the face plate assembly showing the third form of the invention.

FIGS. 10 and 11 show a modified assembly with two arrays of LEDs, and also the face plate setup for this third form of the invention. A two-array face plate 26e contains two large circular openings, top and bottom. The top opening contains an identical set of parts as previously described for the single array 24 of LEDs, including a reflector 46 for illustration, and a transparent window 40, preferably a glass port. The bottom opening contains a molded window 75 that is flat on the front but contains seven integrated total-internal-reflection (TIR) optical cones designed to project light in a spot beam. A modified two-array metal core circuit board 44b is shown with an upper array 76 of 16 LEDs and a lower array 77 of seven LEDs in a preferred embodiment, though either number of LEDs could vary.

In this form of the invention, the face plate 26e has two large side openings 26f which allow water to pass through the face plate to cool the internal electronics more directly. A rear cap 78 in this embodiment encloses the entire metal core circuit board, completely sealing the board against water intrusion. The rear cap 78 is sealed to the metal core circuit board at the center by an o-ring 80, creating a small volume 78a to protect the contact pads on the back of the metal core circuit board. The rear cap is held on by screws S that are independently sealed by o-rings 82, and then by a larger outer o-ring 84 shown in FIG. 12. The rear cap contains an o-ring 86 that forms a bore seal on the opening 18a in the intermediary plate (see FIGS. 4 and 7) in use. Thus the entire front plate assembly is independently sealed, and it can connect to the intermediate plate and provide more direct cooling to the electronics. Water can enter through the front plate and extend into a space between the back of the rear cap 78 and the intermediate plate of the sealed body, cooling both directly. The rear cap draws some heat from the circuit board 44b, and may be of relatively thin heat-conducting metal, directly contacting the metal core circuit board 44b to cool the board from the back. The metal board 44b is of thick metal, e.g. copper or aluminum, about ⅛ inch or greater in thickness. It is also in contact with the front panel of the face plate, the front side of which contacts the outside water, so it is cooled from both sides, which helps minimize temperature for best LED light output.

Figure 12:
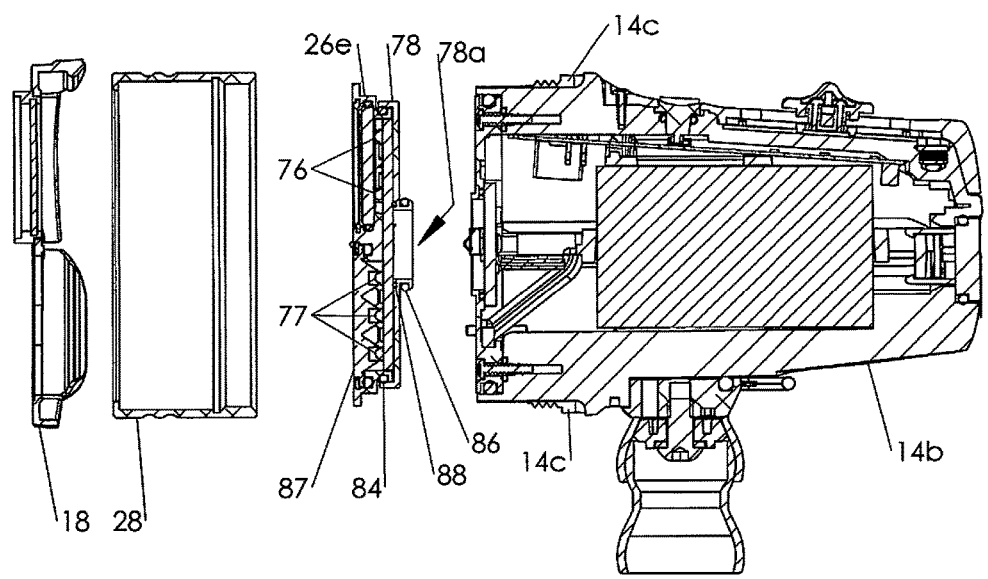
FIG. 12 is a side elevation view in section showing the main assemblies of the third form of the invention exploded by assembly.
Figure 13:
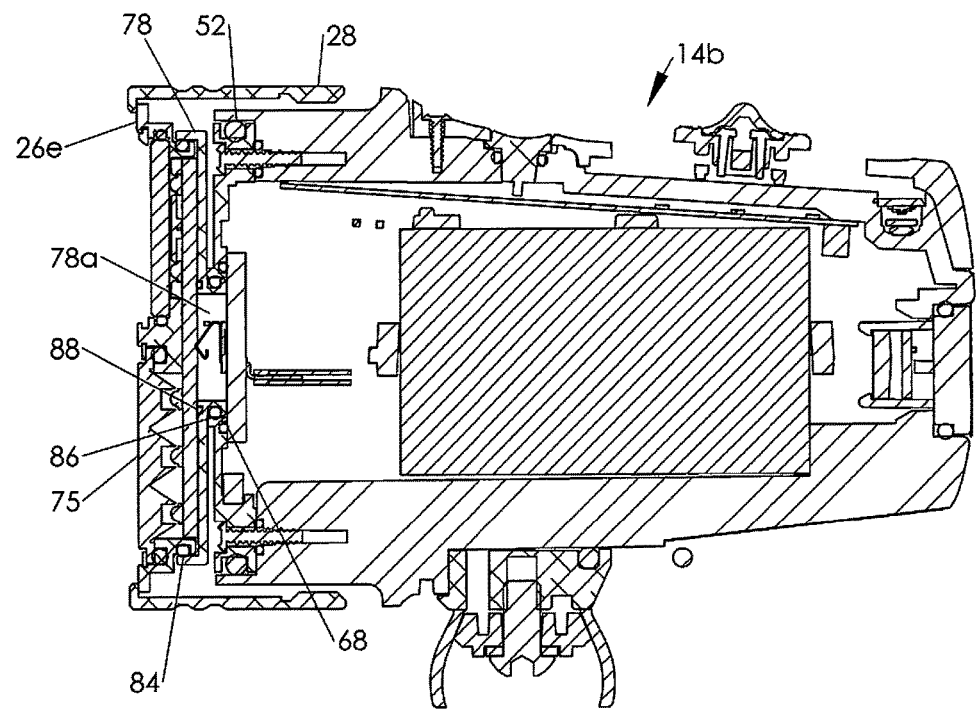
FIG. 13 is a side elevation view in section showing the assembled third form of the invention.

FIGS. 12 and 13 further illustrate the dual array LED embodiment, as well as this third form of the invention. Upper LED array 76 and lower LED array 77 are mounted on the metal core circuit board 44b. The TIR optic 75 is placed in front of the lower array. The outer rim of the rear cap 78 is sealed to the face plate 26e by the o-ring 84. The inner face of the rear cap is sealed to the circuit board by an o-ring 88. These are permanent seals, all within the face plate. The rear cap also contains an o-ring 86 which seals on the bore in the center of the intermediary plate 60. This view also shows a modified body 14b, which has channels 14c at the top and bottom to provide more water flow through the front of the unit. Also, the body 14b is shorter than the previously described version of the body 14a (FIG. 4), both because it does not need to provide a bore seal to the face plate assembly, and because the shorter body provides for better water flow.

FIGS. 14 and 15 show the openings that allow water to flow through the assembly. FIG. 14 is a side elevation cross section which shows the cuts in the body identified above as 14c, that allow water to travel from the top and bottom behind the front bezel ring. The male threads (not shown but seen in FIG. 12) at the front of the body 14b are interrupted at these cuts or channels 14c. FIG. 15 shows a top plan cross section which shows the larger openings 26f which allow water to enter from the front. The areas shown are all connected, so water can freely flow through and circulate via these four openings. More openings could be provided if desired. The water cooling space between the intermediate plate 60 and the rear cap 78 is seen at 89.

Figure 16:
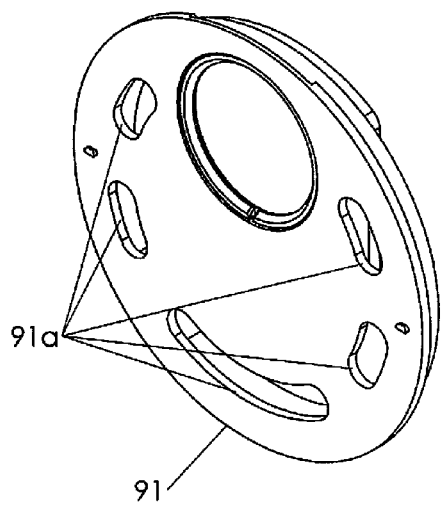
FIG. 16 shows the front of the face plate assembly of the fourth form of the invention.
Figure 17:
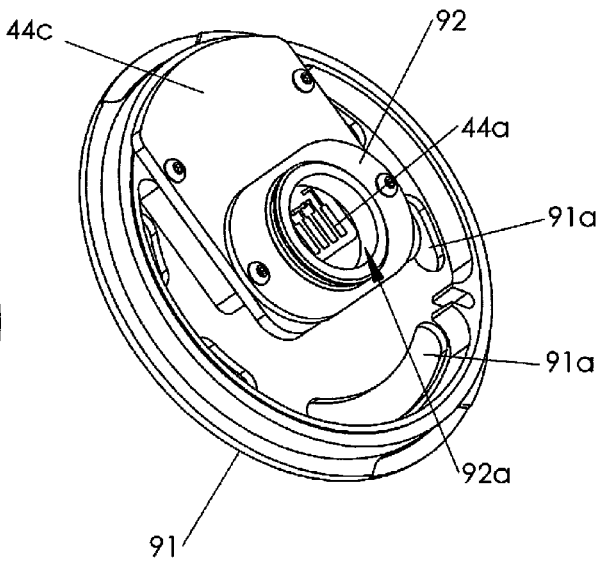
FIG. 17 shows the rear of the face plate assembly of the fourth form of the invention.
Figure 18:
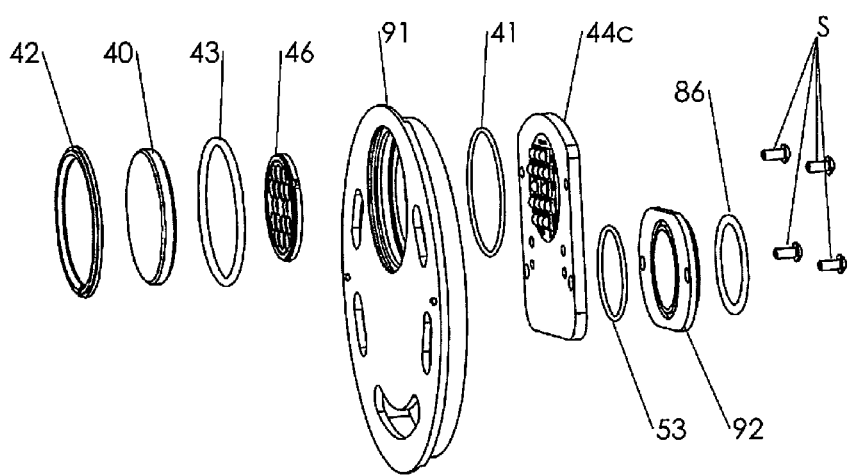
FIG. 18 shows an exploded view of the face plate assembly of the fourth form of the invention.

FIGS. 16 through 18 show a fourth form of the invention. A modified face plate 91 has openings 91a that function similarly to the openings 26f. The shape difference compared to 26f is cosmetic. FIGS. 17 and 18 show the metal core circuit board 44c, now exposed to flowing water (not covered by a rear cap as in FIGS. 10-15), with a smaller, modified form 92 of rear cap. In this form, the cap forms a volume 92a exactly like 78a described above, to enclose the connector pads 44a. However, this cap only seals off a small area of the metal core circuit board with an o-ring 53, leaving the rest exposed to water. The rear cap 92 is sealed to the intermediary plate by a bore seal o-ring 86. The rear cap and metal core circuit board are bolted to the face plate 91 with four screws S to form a permanently sealed face plate assembly. The cooling water enters the space behind the face plate via the openings 91a and directly contacts the metal core circuit board 44c as well as the intermediate plate 60 of the main casing or body. Again, the face plate is easily removable from the main body for interchanging a different face plate or for air travel safety requirements, and also for rinsing salt water off these inner components; rinsing is important for all embodiments.

As noted above, cooling of the metal core circuit board by contact with ambient water is important and preferred, for optimum LED performance. With the water entering the assembly and directly contacting the metal board from behind, the front panel of the face plate might even be formed of plastic.

Figure 19:
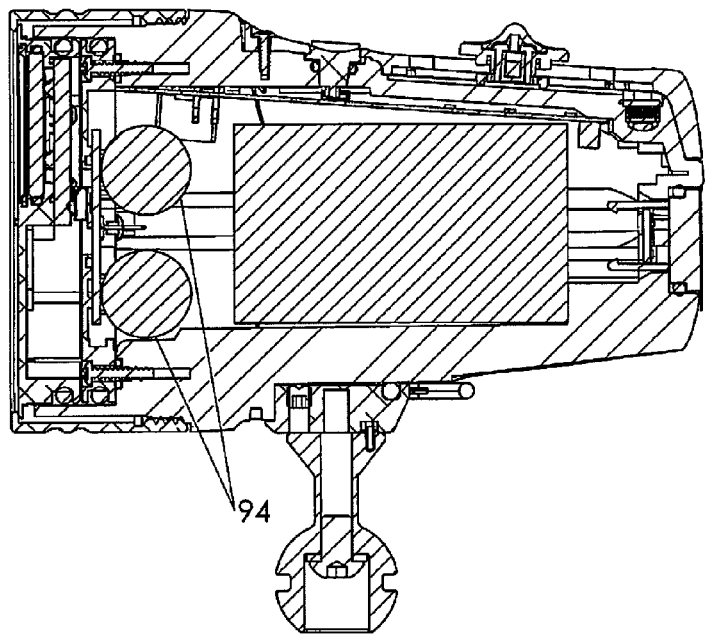
FIG. 19 shows a side elevation section view of the complete unit with large capacitors added to the electronic circuit.

FIG. 19 shows the complete assembly with a single LED array, with the addition of two large capacitors 94 attached to the connector circuit board. In this embodiment, the capacitors shown are rated at 1 microfarad at 100 volts. The battery and driver electronics charge up the capacitor between pulses, and then the capacitors discharge into the LED array on a timing signal, producing approximately 8000 lumens for 1-3 microseconds, as a flash.

Figure 20:
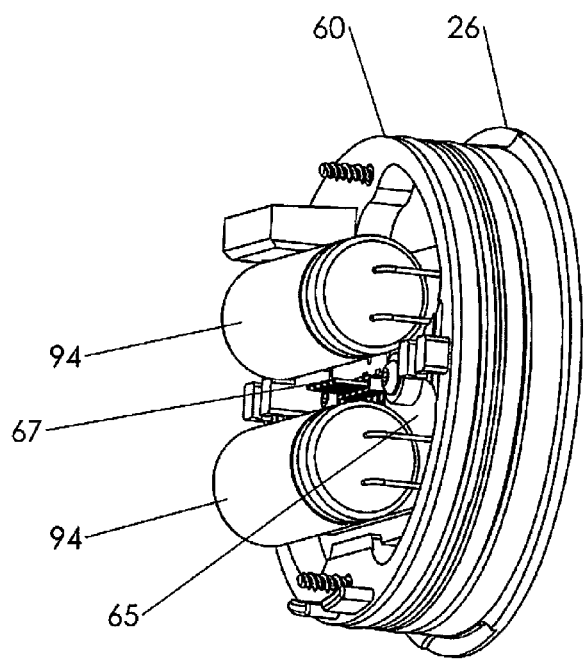
FIG. 20 shows an aspect view of the intermediary plate and the face plate assembly, showing the capacitors on the connector PCBA.

FIG. 20 shows a detailed view of the intermediary plate 60 and a face plate 26a assembled together, with the capacitors 94 attached to the connector board 65, with the connector 67 that brings power and timing signal from the control electronics.

In one preferred embodiment the dive light 10 produces a maximum flood light output (level 7) power of 4000 lumens, which can be maintained for about 50 minutes to one hour. At a medium power setting (level 4) of 1500 lumens, the duration is about 150 minutes. At a low setting (level 1) of 500 lumens, the flood beam will last for about 10 hours. Charge time: 85% at 90 minutes, 100% at 150 minutes. The unit preferably weighs no more than about 750 grams (about 1.65 lb.).

FIGS. 21 through 29 show another embodiment of the invention. In this embodiment, the power of the underwater light 100 is considerably higher, with an output of about 8000 lumens or greater. The light is powered by an enlarged battery pack 102 which is contained preferably in the back of a casing or housing 104. The battery 102 may have, for example, six cells, each a 18650 lithium-ion cell, packaged together as shown. These are approximately 3.4 Ahr cells and the battery may have a nominal voltage of 21.6 V. The battery 102 powers a PCB driver 106 on a plate, as shown, and the driver is connected to and drives an LED mounting plate 108 with an LED array, preferably an array formed on a metal/ceramic substrate. The array can advantageously be in a "chip on board" arrangement. Alternatively it could be a tightly packed array of discrete LEDs soldered onto a metal core (or other) circuit board as shown in the earlier drawing figures. With an output of about 8000 lumens or more, the LED array draws high power such that the battery 102 is discharging at a high rate which may be about 5 amperes. The high discharge rate causes the battery cells to heat up due to their internal resistance. These battery cells will shut down if their temperature increases too much, and pursuant to the invention the battery is cooled to maintain the high power output. The battery must remain below about 60° C. to operate safely and maintain its high discharge rate. The cooling is effective to maintain the high discharge rate of the battery, for a light output of 8000 lumens or higher.

Figure 22:
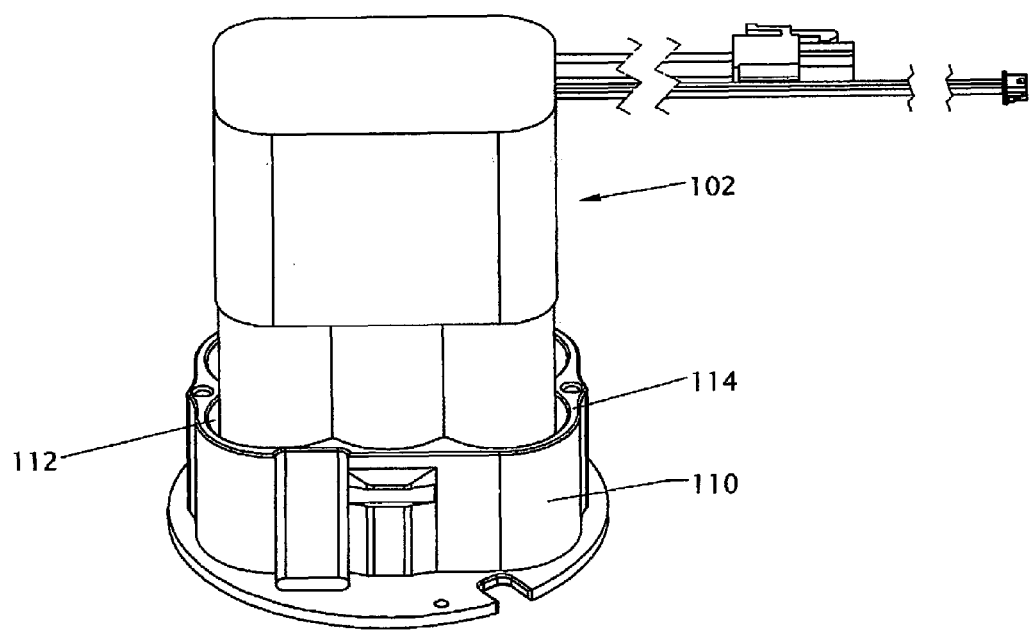
FIGS. 22 and 23 are perspective views showing a component of the embodiment shown in FIG. 21.

In this embodiment of the invention, the battery 102 is potted in an aluminum plate 110 of the light assembly to enhance thermal contact between the battery cells and the aluminum casing. FIG. 22 shows the battery 102 as potted in the back side of the aluminum (or otherwise conducted metal) plate or casing 110. The potting material can advantageously be a thermally-conductive epoxy 112, such as a two-part epoxy. Approximately 20% of the length of the battery cells preferably is potted within the recess or cup 114 of the casing (or a preferred range of about 15% to 30%).

Figure 21:
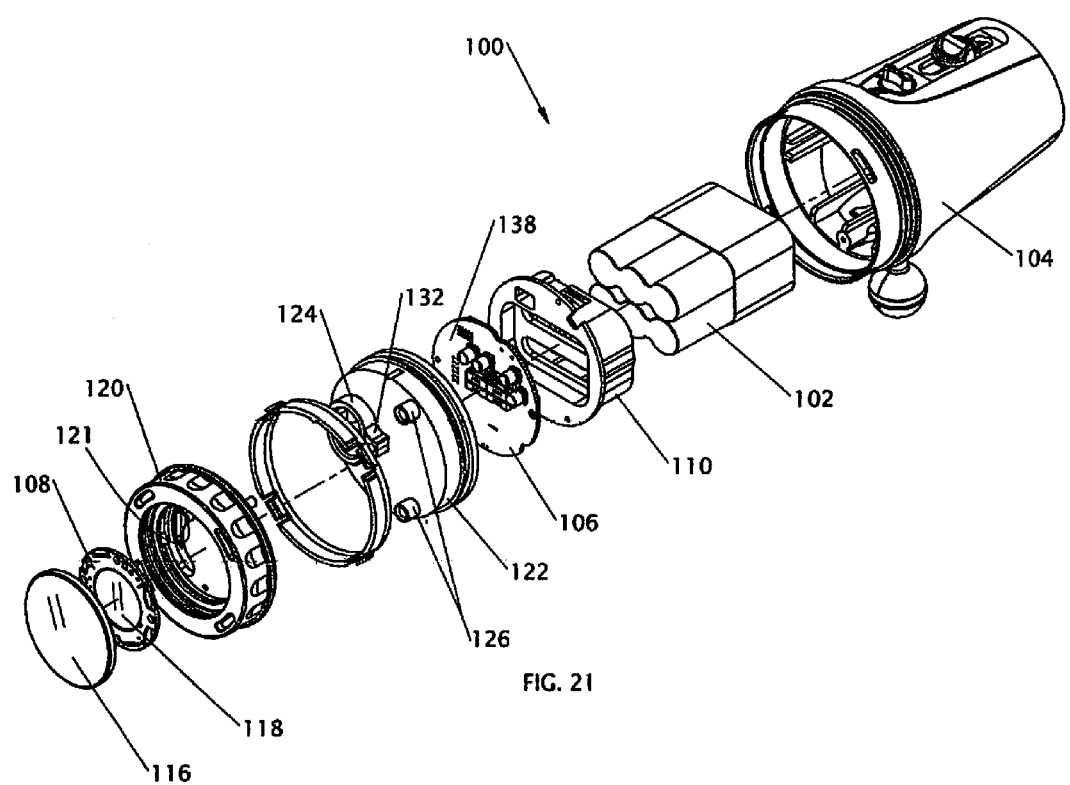
FIG. 21 is an exploded perspective view showing the components of another embodiment of an underwater light unit according to the invention.
Figure 24:
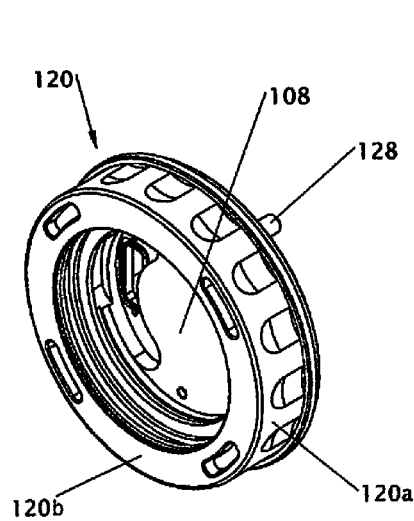
FIG. 24 is a perspective view showing a battery pack potted in a metal component of the assembly, for heat transfer and battery cooling.
Figure 23:
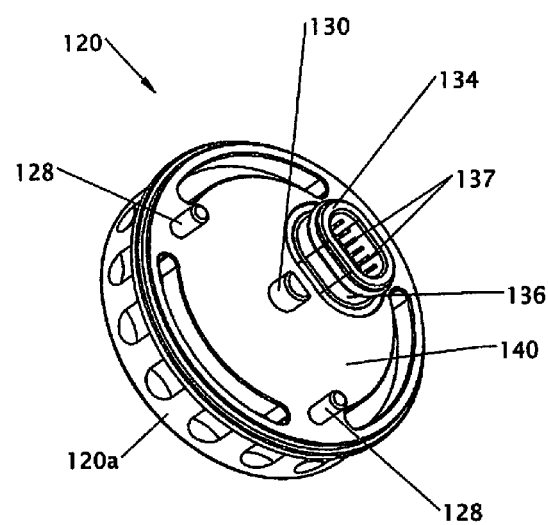

FIG. 21, the exploded view, shows the various components. These include a glass portal or window 116, and the LED plate 108, preferably with a metal/ceramic LED substrate 118 as noted above. The plate 108 is assembled into a circular metal face plate or puck 120, also preferably of aluminum, in which it is secured and sealed behind the glass 116, which may be by small screws attaching the LED plate to the inside back of the puck. A small PCB preferably is secured at 121 in the puck, between the LED plate 108 and the puck or wall. This PCB (not shown) is connected to the LED array and can carry connection pins (as seen in FIG. 23). The small PCB can include a thermistor and an EEPROM that identifies the puck or head, since the puck can be interchangeable, to provide different light characteristics. The puck is highly thermally conductive, and the assembly is such that ambient water can circulate on the face, sides and back of the puck. In the assembly the face plate or puck is held against an inner or intermediary plate 122, with alignment posts 124 and 126 that also act as standoffs to hold the puck away from the plate 122 to allow water to circulate between the two metal parts, 120 and 122. The puck 120, with the LED plate 108 secured to it, is shown in FIGS. 23 and 24. In FIG. 23 the rear side of the puck is visible, as is the outer peripheral rim 120a. Alignment pins are shown at 128 and 130 on the puck, the pins 128 fitting into the standoff protrusions 126 seen in FIG. 21, on the plate 122. The third pin or standoff element 130 on the back of the puck engages with a protrusion 132 that is part of the post or standoff 124 on the plate 122. The puck 120 makes a sealed connection with the intermediary plate 122 via a collar 134 on the puck that engages into the structure 124 on the plate 122, these elements being shown as racetrack-shaped in the drawings. An O-ring 136 makes a seal between these two elements, and a connection is made for power and control signals between the LED plate 108 and the printed circuit board driver 106 by pins 137 (seen in FIG. 23) that engage in pin sockets 138 on the PCB driver plate 106. When assembled, the PCB driver plate 106 extends into the cup-shaped back side of the plate 122, the connector pin sockets 138 being adjacent to the opening defined at the collar standoff protrusion 124.

As noted above, cooling is a very important feature of the invention in this embodiment. FIG. 24 shows the LED array and plate 108 secured within the puck 120 and against the inside back of the puck, i.e. against the opposite face of the puck's back wall 140 that is visible in FIG. 23. This is important for LED cooling. A contiguous metal cooling path is provided from the LED plate 108 to ambient water, which contacts the back of the face plate or puck (inside the diving light assembly) and also contacts the exterior of the puck, surrounding the puck at the front of the assembled light.

Figure 26:
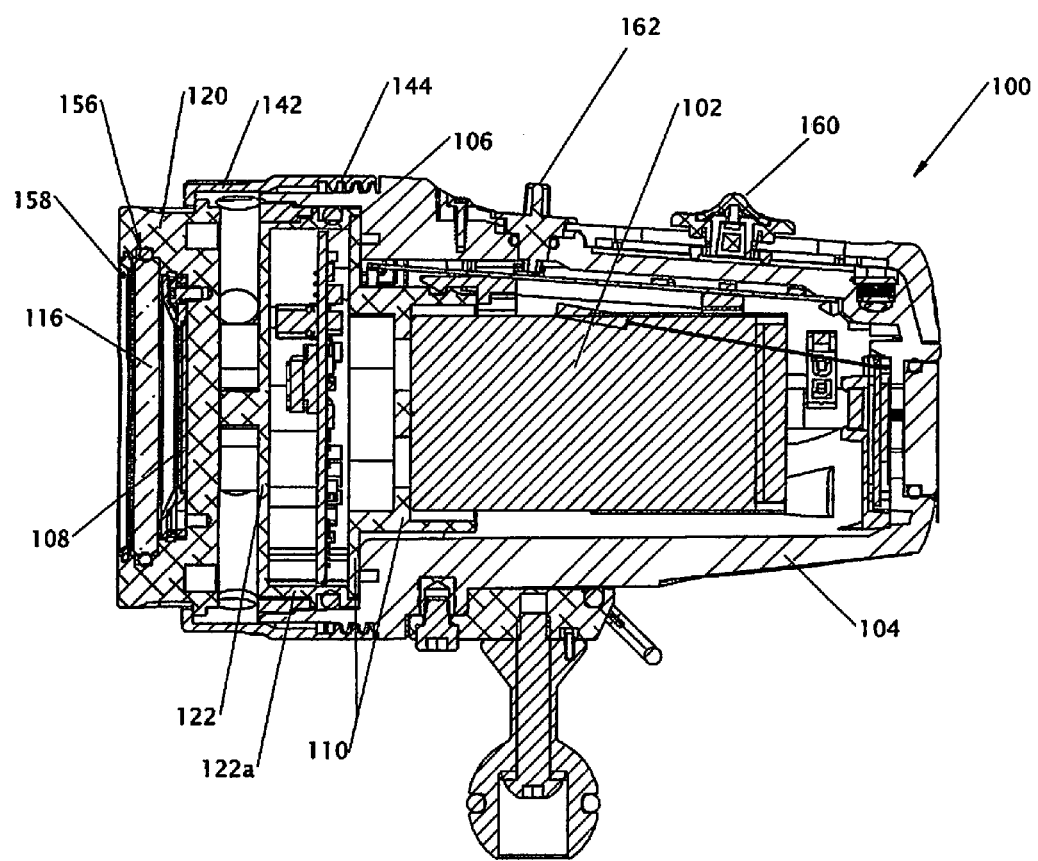
Figure 28:
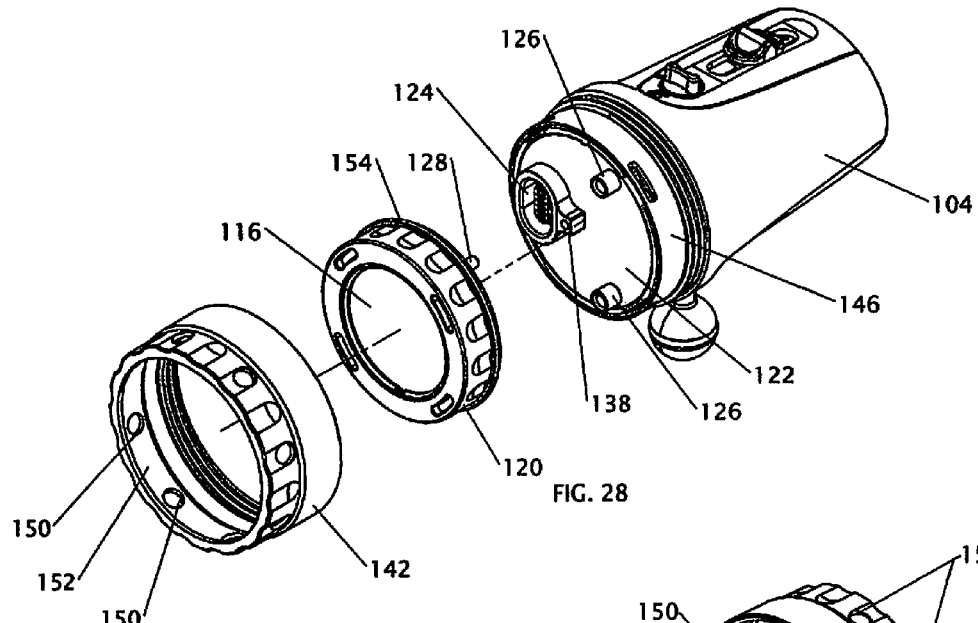
FIGS. 28 and 29 are exploded perspective views showing components and indicating assembly of this embodiment of the invention.
Figure 29:
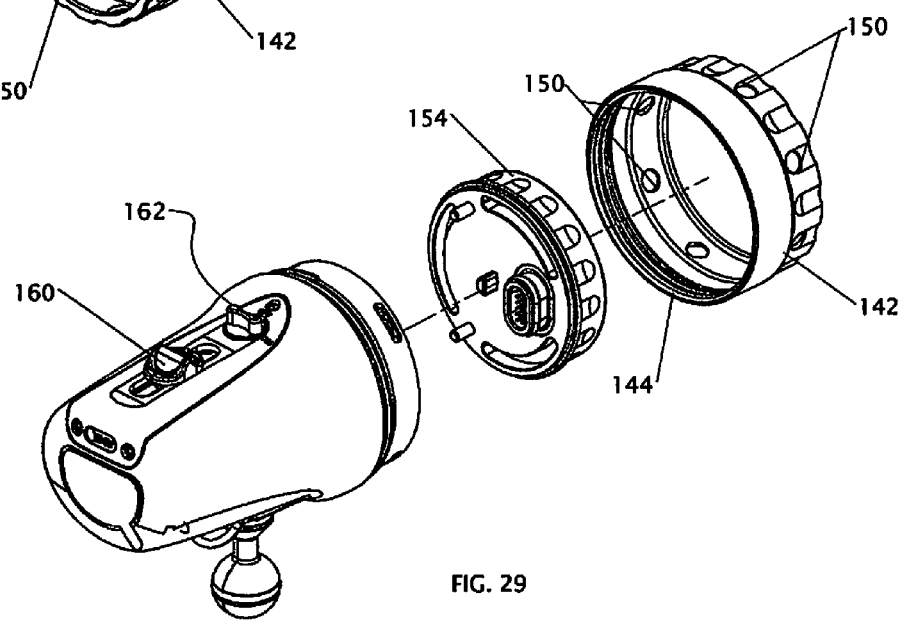

FIGS. 25, 26 and 27 show the assembled underwater light 100 in partial-section, section and front elevation views. FIG. 25 shows the flow of ambient water through the unit, between the puck 120 (which carries the LED plate 108, as shown in FIGS. 24, 21 and 27) and the plate or cup 122 that is in a sealed connection with the puck 120 but with space between them as explained above. These drawings should be viewed also in connection with FIGS. 28 and 29, showing a bezel 142 with threads 144 that engage with threads 146 on the body or casing 104 of the light assembly. The bezel 142 secures the puck 120, which is plugged into and connected electrically at the standoff/collar 124, against the body.

As seen in FIGS. 25-29, the bezel 142 has a series of holes 150 in its annular outer edge, for pass-through of water. The bezel has an internal rim 152 that presses against an exterior rim 154 on the puck, as shown in FIGS. 28 and 29, to engage the puck and hold it firmly in place against the body 104, via the spacer nipples 128 and 130, engaging in recesses of the protruding spacers 126 and 132 at the front of the body or housing 104. The intermediary plate 122, is assembled to the body and secured in place with a retaining ring (not shown) that has snap features that seat into a recessed area on the body 104. The intermediary plate is pressed into the body until it stops against a shelf (not shown). The retaining ring is then snapped into place, completing the body side of the assembly. Once assembled the body side is itself a sealed unit. The exposed connectors embedded in the intermediary plate are splash resistant, but not designed to go to depth without the LED puck plugged in. The puck 120 is itself independently sealed; when the puck and bezel are connected onto the body, both the puck and body are sealed against water intrusion, but water can freely flow through the light assembly, between the back of the puck 120 and the plate 122 on the body.

As noted above, the LED plate 108 is at the rear of the puck, immediately adjacent to the back wall 140 of the puck, so that ambient water flowing against the back of the puck is effective to cool the high-powered LED array 118. The water also effectively cools the cup or plate 122 at the front of the casing, which cools the PCB driver 106 within the plate 122, and by metal-to-metal contact cools the shielding aluminum plate 110 within which the battery 102 is potted as described above, each cell being cooled from its forward end. Thus, the battery pack is effectively cooled as discussed above. In addition, at the front of the unit 100 the puck 120 extends with its outer metal rim 120a almost entirely exposed. A not insignificant area 120b at the front of the unit, i.e. an annulus of space, is also preferably exposed to ambient water. These further areas of exposure of the puck to ambient water further effect cooling of the LED plate 108, adding to the cooling effect of water flowing over the back side of the puck.

Instead of, or in addition to, the cooling of the battery from the front, the battery could be cooled from the rear or sides of the housing or body 104. A rear portion (or the entire battery) can be covered by metal (or potted in a sleeve or recess), with a contiguous metal heat conductive path to exterior of the body, which could be metal or have metal portions.

The sectional elevation view of FIG. 26 shows the entire assembled light unit 100. The battery pack 102 is contained deep within the body or housing 104, with a portion of its forward end contained within and potted into the shielding plate 110. This plate 110 is adjacent to the PCB driver 106 at its forward end, and the metal intermediary cup/plate 122 has an annular flange or rim 122a that engages against the front of the metal shield 110 in a metal-to-metal connection and creating a contiguous metal thermal path (from battery to ambient water) to cool the potted battery; the outward face of the plate 122 is in direct contact with water. The PCB driver 106 is contained within the outer rim 122a of the cup 122. The connected and sealed-together collars 124 and 134 are not seen in the sectional view of FIG. 26, beyond the plane of the cross section. However, the puck is clearly seen at 120, held onto the housing by the threaded bezel 142. The LED plate 108 is against the inside back surface of the puck 120, and the glass 116 is retained just inside the front annular rim of the puck in a sealed connection, with an O-ring 156 contained in the puck. The glass may be retained in place with a ring clip 158 snapped into a groove in the inside surface of the puck 120.

The underwater light unit 100 includes a switch assembly 160 as seen in the drawings. This can be a magnetic slide switch which does not breach the water barrier of the housing 104, as described in U.S. Pub. No. 2012/0120639, which is incorporated herein by reference. Forward of the switch 160 is a rotary on/off magnetic switch 162 that rotates to between two positions. In the off position the power is disconnected from the LED array to allow for long periods of storage or for travel.

The invention achieves a very high light output in a compact underwater diving light. An output of at least 8000 lumens is achieved with a battery pack no larger than six 18650 lithium-ion cells, the example given above. This would not be possible without battery cooling, as well as LED cooling, efficiently implemented with the system of the invention, providing contiguous metal cooling paths both from the battery pack to ambient water and from the LED array and mounting plate to ambient water. In the preferred embodiment an 8000 lumen output level can be maintained for about 40 minutes. At a low power setting of about 1000 lumens, the duration is about 5 hours or more. Charge time: 100% at about 2 hours. The unit preferably weighs no more than about 980 grams (2.16 lbs.), with a length of about WA inches and a diameter at the bezel of about 3½ inches. The volume is no more than about 42 to 50 cubic inches.

The above described preferred embodiments are intended to illustrate the principles of the invention, but not to limit its scope. Other embodiments and variations to these preferred embodiments will be apparent to those skilled in the art and may be made without departing from the spirit and scope of the invention.

We claim:

1. A diving light for underwater photography, comprising:
a housing or body containing a battery and electronics, the body being sealed against intrusion of water,
a face plate of heat-conducting metal on the front of the housing or body, the face plate facing forward, comprising contiguous metal and including an LED light source positioned to project through a window in the face plate, the LED light source being mounted on an LED mounting plate directly secured against said contiguous metal of the face plate and in thermal conductive contact with said contiguous metal of the face plate,
the contiguous metal of the face plate being positioned to be in direct contact with water around the front of the diving light such that heat from the LED light source is conducted from the LED mounting plate into the contiguous metal of the face plate and directly into the water at an exterior of the face plate,
the face plate being configured such that water can enter the diving light between the body and said contiguous metal of the face plate to contact a back side of said contiguous metal of the face plate to cool the LED light source from a back side of the LED light source, and
a water-sealed switch on the exterior of the housing or body, connected to selectively power the LED light source, at desired light levels,
whereby cooling of the LED light source is effected by contact of water with the face plate at an exterior front of the diving light and also at the back side of the face plate.

2. The diving light of claim 1, including a bezel secured to the front of the housing or body with screw threads, the face plate being secured against the housing or body by the bezel, the bezel being removable so as to enable removal of the face plate and securing of a different face plate against the body if desired.

3. The diving light of claim 2, wherein the LED light source is positioned off-center on the face plate, and further including a filter ring secured over the front bezel and over the front of the face plate, rotatable on the front bezel and with at least one filter for positioning in the path of the LED light, rotation being effective to select use of the filter or non-use of the filter.

4. The diving light of claim 1, capable of producing a maximum flood light output power of about 4000 lumens which can be maintained for at least about 50 minutes.

5. The diving light of claim 4, wherein the battery is rechargeable to about 85% in 90 minutes and to full charge in about 150 minutes.

6. The diving light assembly of claim 1, capable of producing a maximum light output power of about 8000 lumens which can be maintained for at least about 40 minutes.

7. The diving light assembly of claim 6, wherein the battery is rechargeable to full charge in about 2 hours.

8. The diving light assembly of claim 6, wherein the battery is cooled by ambient water.

9. The diving light assembly of claim 8, including a metal battery plate defining a cup-shaped recess engaged over a portion of the battery, which is potted within the recess, and the housing or body including a metal intermediary plate at the front of and closing the housing or body, the intermediary plate being in thermal conductive contact with the metal battery plate, and the intermediary plate being spaced from the face plate in the assembled diving light such that water entering the diving light contacts the intermediary plate at the front of the body as well as contacting said contiguous metal of the face plate, whereby both the battery and the LED light source are cooled by water entering the diving light, via conductive metal paths.

10. The diving light of claim 6, wherein a current of about 5 amperes is drawn from the battery at an 8000-lumen light output.

11. The diving light of claim 1, including a metal battery plate defining a cup-shaped recess engaged over a portion of the battery, which is potted within the recess, and the housing or body including a metal intermediary plate at the front of and closing the housing or body, the intermediary plate being in thermal conductive contact with the metal battery plate, and the intermediary plate being spaced from the face plate in the assembled diving light such that water entering the diving light contacts the intermediary plate at the front of the body as well as contacting said contiguous metal of the face plate, whereby both the battery and the LED light source are cooled by water entering the diving light, via conductive metal paths.

12. The diving light of claim 1, wherein the LED light source comprises a chip on board LED arrangement.

13. A diving light for underwater use, comprising:
a housing or body containing a battery and electronics, the body being sealed against intrusion of water,
a face plate or puck of heat-conducting metal attached to the front of the housing or body, including an LED light source positioned to project through a window of the face plate or puck, the LED light source being on an LED plate in heat-conductive contact with metal of the face plate or puck,
the housing or body having a front intermediary plate, closing the housing or body, and including spacer means between the intermediary plate and the face plate or puck maintaining a space for ambient water flow between the intermediary plate and the face plate or puck in the assembled diving light, and including a sealed connection between the intermediary plate and the puck defining a conduit for power and signals between the LED plate and the housing or body, the sealed connection occupying a portion of the intermediary plate, whereby water flowing between the intermediary plate and the face plate or puck effectively cools the LED light source as well as cooling the intermediary plate, and
a contiguous metal heat conductive path in the housing or body from the battery to the intermediary plate, so that the battery is also cooled by ambient water.

14. The diving light of claim 13, wherein the contiguous metal heat conductive path in the housing comprises the battery being potted in a recess of a metal plate, the metal plate making heat conductive contact with the intermediary plate.

15. The diving light of claim 13, including an LED driver board between the battery and the intermediary plate, the LED driver board being connected to the LED light source through the conduit.

16. The diving light of claim 13, wherein the LED light source comprises a chip on board LED arrangement.

17. The diving light of claim 13, including a screw threaded bezel attaching the face plate or puck to the front of the housing or body, the bezel including peripheral openings positioned to admit ambient water into the diving light, to flow between the intermediary plate and the face plate or puck.

18. A diving light for underwater use, comprising:
- a housing containing a battery and electronics, the housing being sealed against intrusion of water,
- a face plate or puck of heat-conducting metal attached to the front of the housing, including an LED light source positioned to project through a window of the face plate or puck, the LED light source being secured on an LED plate in heat-conductive contact with metal of the face plate or puck,
- the housing having an intermediary plate at front, closing the housing, and including spacer means between the intermediary plate and the face plate or puck maintaining a space for ambient water flow between the intermediary plate and the face plate or puck in the assembled diving light, and including a sealed connection between the intermediary plate and the puck defining a conduit for power and signals between the LED plate and the housing or body, the sealed connection occupying a portion of the intermediary plate, whereby water flowing between the intermediary plate and the face plate or puck effectively cools the LED light source, and
- means for dissipating heat from the battery to ambient water, for cooling of the battery.

19. The diving light of claim 18, wherein the means for dissipating heat comprises a heat conducting path from the battery to the intermediary plate, whereby heat from the battery is dissipated via the intermediary plate.

\* \* \* \* \*